United States Patent [19]

Le Loarer et al.

[11] Patent Number: 5,279,789
[45] Date of Patent: Jan. 18, 1994

[54] CERIC OXIDE PARTICULATES HAVING IMPROVED MORPHOLOGY

[75] Inventors: Jean-Luc Le Loarer, La Rochelle; Francoise Picard, Fontenay/Sous/Bois; Claire David, Paris, all of France

[73] Assignee: Rhone-Poulenc Chimie, Courbevoie, France

[21] Appl. No.: 920,540

[22] Filed: Jul. 28, 1992

Related U.S. Application Data

[63] Continuation of Ser. No. 456,378, Dec. 26, 1989, abandoned.

[30] Foreign Application Priority Data

Dec. 23, 1988 [FR] France ................... 88 17069

[51] Int. Cl.⁵ ................................. C01F 17/00
[52] U.S. Cl. ................................. 423/21.1; 423/263; 423/592
[58] Field of Search ............... 423/21.1, 263, 592; 502/304

[56] References Cited

U.S. PATENT DOCUMENTS

| | | | |
|---|---|---|---|
| 3,761,571 | 9/1973 | Woodhead | 423/263 |
| 4,049,463 | 9/1977 | Hafner | 423/263 |
| 4,231,893 | 11/1980 | Woodhead | 423/263 |
| 4,356,106 | 10/1982 | Woodhead et al. | 423/263 |
| 4,661,330 | 4/1987 | Chane-Ching et al. | 423/263 |
| 4,663,137 | 5/1987 | Chane-Ching et al. | 423/263 |
| 4,859,432 | 8/1989 | David et al. | 423/263 |
| 4,940,685 | 7/1990 | Sauvion et al. | 502/304 |
| 4,965,057 | 10/1990 | David et al. | 423/263 |
| 4,965,243 | 10/1990 | Yamada et al. | 502/304 |
| 5,002,747 | 3/1991 | LeLoarer | 423/263 |
| 5,011,671 | 4/1991 | LeLoarer | 423/263 |
| 5,017,352 | 5/1991 | Chane-Ching et al. | 423/263 |
| 5,023,070 | 6/1991 | LeLoarer | 423/592 |
| 5,064,628 | 11/1991 | Chane-Ching et al. | 423/263 |
| 5,080,877 | 1/1992 | Chane-Ching et al. | 423/263 |

FOREIGN PATENT DOCUMENTS

| | | | |
|---|---|---|---|
| 0153228 | 8/1985 | European Pat. Off. | |
| 0206906 | 12/1986 | European Pat. Off. | 423/263 |
| 0208580 | 1/1987 | European Pat. Off. | |
| 0238367 | 9/1987 | European Pat. Off. | |
| 0239478 | 9/1987 | European Pat. Off. | |
| 0239479 | 9/1987 | European Pat. Off. | 423/21.1 |
| 0316205 | 5/1989 | European Pat. Off. | 423/21.1 |
| 1-148710 | 6/1989 | Japan | 423/263 |
| 833525 | 5/1981 | U.S.S.R. | 423/263 |

Primary Examiner—Michael Lewis
Assistant Examiner—Steven Bos
Attorney, Agent, or Firm—Burns, Doane, Swecker & Mathis

[57] ABSTRACT

Ceric oxide particulates having a specific surface of at least 190 m²/g, measured after calcination at a temperature of from 350° to 450° C., and a specific surface of at least 15 m²/g after calcination at 800° C., are prepared by (a) suspending, in an aqueous solution of a decomposable base, a ceric hydroxide of the formula (I):

$$Ce(M)_x(OH)_y(NO_3)_z \qquad (I)$$

wherein M is an alkali metal or a quaternary ammonium radical; x is a number ranging from 0.01 to 0.2; y is such that y=4−z+x; and z is a number ranging from 0.4 to 0.7; (b) heating the resulting suspension in a confined reaction zone to a temperature and pressure respectively lower than its critical temperature and pressure; (c) cooling such reaction medium and permitting it to return to atmospheric pressure; (d) separating the ceric hydroxide thus treated; and (e) calcining the separated ceric hydroxide.

18 Claims, No Drawings

CERIC OXIDE PARTICULATES HAVING IMPROVED MORPHOLOGY

This application is a continuation of application Ser. No. 07/456,378, filed Dec. 26, 1989, now abandoned.

BACKGROUND OF THE INVENTION

1. Field of the Invention

The present invention relates to novel ceric oxide particulates having improved morphological characteristics, including a large specific surface at an elevated temperature, and to a process for the production of such novel ceric oxide particulates.

In the description that follows, by the term "specific surface" is intended the BET specific surface determined by the adsorption of nitrogen according to ASTM Standard D 3663-78, established by the BRUNAUER-EMMETT-TELLER method described in the *Journal of the American Chemical Society*, 60, 309 (1938).

2. Description of the Prior Art

It is known to this art that ceric oxide is a useful catalyst or catalyst support. Compare, for example, the work of Paul Meriaudeau et al relative to the synthesis of methanol from $CO+H_2$ on catalysts comprising platinum deposited onto ceric oxide (*C.R. Acad. Sc. Paris*, Vol. 297—Series II—471 (1983)).

It too is known to this art that the effectiveness of a catalyst is typically a function of the amount of the surface area of the catalyst in contact with the reagents. Thus, it is necessary to provide and maintain the catalyst in the highest possible divided state, i.e., the solid particles comprising same should be as small and individualized as possible. The fundamental role of the support is thus to maintain the catalyst particles or crystallites in contact with the reagents, in the highest possible divided state.

Upon extended use of the catalyst support, its specific surface is reduced due to the coalescence of the very fine micropores. Over the course of such coalescence, a portion of the volume of the catalyst is merged into the mass of the support and is no longer able to be contacted by the reagents.

Heretofore, most of the known ceric oxides had a specific surface which decreased rapidly at operating temperatures higher than 500° C. Thus, R. Alvero et al (*J. Chem. Soc., Dalton Trans.*, 87 (1984)) prepared a ceric oxide from ammonium cerinitrate having, after calcination at 600° C., a specific surface of 29 $m^2/g$.

FR-A 2,559,754 further describes a ceric oxide having a specific surface of at least 85±5 $m^2/g$ prepared by calcination at a temperature ranging from 350° to 450° C., preferably having a specific surface of from 100 to 130 $m^2/g$ after calcination at a temperature of from 400° to 450° C. This oxide is prepared by the hydrolysis of an aqueous solution of ceric nitrate in a nitric acid medium, followed by separation of the precipitate thus formed, washing with an organic solvent, optional drying, and, finally, calcination. The final product ceric oxide has a desirable specific surface, when calcined at a temperature ranging from 300° to 600° C. However, a decrease in the specific surface is observed after calcination at a higher temperature, such specific surface being about 10 $m^2/g$ after calcination at 800° C.

In FR-A 2,559,755, a ceric oxide is described having a specific surface of at least 85 ±5 $m^2/g$ after calcination at a temperature of from 350° to 500° C., and preferably a specific surface ranging from 150 to 180 $m^2/g$ after calcination at a temperature of from 400° to 450° C. This oxide is prepared by precipitating a basic ceric sulfate by reacting an aqueous solution of ceric nitrate with an aqueous solution containing sulfate ions, separating the precipitate thus formed, washing the precipitate with an ammonia solution, optionally drying it, and then calcining such precipitate at a temperature ranging from 300° to 500° C. The ceric oxide prepared in this manner has a large specific surface, but when subjected to a calcining operation at 800° C., its specific surface decreases considerably, to about 10 $m^2/g$.

In EP 88/401,593.4(corresponding to European Patent No. 300851 B granted Feb. 26, 1992, and U.S. Pat. Nos. 5,011,671; 5,023,070 and 5,174,984), assigned to the assignee hereof, a process is described for increasing and stabilizing the specific surface of a ceric oxide at an elevated temperature.

Such process entails exposing the ceric oxide or precursor of ceric oxide to a solvothermal treatment prior to the calcining operation.

More particularly, such process comprises:

(a) suspending ceric hydroxide in a liquid medium;

(b) heating the suspension in an enclosure to a temperature and pressure respectively lower than the critical temperature and critical pressure of said medium;

(c) cooling the reaction medium and permitting it to return to atmospheric pressure;

(d) separating the ceric hydroxide treated in this manner; and (e) calcining the separated ceric hydroxide.

By "ceric hydroxide" is intended a hydrated ceric oxide $CeO_2 \cdot 2 H_2O$, or a ceric hydroxide which may contain residual anions whether bonded or adsorbed, such as, for example, chlorides, sulfates, acetates, formates, and the like.

A preferred embodiment of EP 88/401,593.4 includes using a base solution as the liquid autoclaving medium.

Such a process makes it possible not only to increase the specific surface of the final product ceric oxide, but also same retains a large specific surface at temperatures of up to about 900° C.

According to EP 88/401,594.2 (corresponding to European Patent No. 300852 B granted Sep. 18, 1991 and U.S. Pat. No. 5,174,984), by subjecting a ceric hydroxide prepared by reacting a cerium salt solution with a base, optionally in the presence of an oxidizing agent, at a pH greater than 7, to an autoclave treatment in a basic medium, a ceric oxide is produced having a specific surface at 800° to 900° C. never before attained in this art.

The ceric oxide thus produced has a specific surface of at least 15 $m^2/g$ measured after calcination at a temperature of 800° to 900° C., such specific surface preferably ranging from 20 to 60 $m^2/g$ measured after calcination at 800° C.

It has a specific surface of 160 to 15 $m^2/g$ measured after calcination at a temperature ranging from 350° to 900° C.

Therefore, it may have a specific surface of from 70 to 160 $m^2/g$, and preferably ranging from 100 to 160 $m^2/g$, measured after calcination at a temperature ranging from 350° to 450° C.

In the present application, the specific surfaces reported are measured on a final product calcined for at least 2 hours at the given temperature.

It has now unexpectedly and surprisingly been determined that in carrying out the process described in EP 88/401,593.4, but judiciously selecting the starting material ceric hydroxide and the liquid dispersion medium, a ceric oxide is prepared having still further improved morphological characteristics.

SUMMARY OF THE INVENTION

Accordingly, a major object of the present invention is the provision of novel ceric oxide particulates having improved morphological characteristics, notably a high specific surface, after calcination both at low and elevated temperatures.

Briefly, the ceric oxide particulates of the present invention are characterized by having a specific surface of at least 190 m$^2$/g, preferably at least 200 m$^2$/g, measured after calcination at 350° to 450° C. Indeed, the specific surface noted above is measured on a ceric oxide calcined at the temperature indicated.

DETAILED DESCRIPTION OF THE PREFERRED EMBODIMENTS OF THE INVENTION

More particularly according to the present invention, the preferred ceric oxide has a specific surface ranging from 200 to 280 m$^2$/g, measured after calcination at 350° to 450° C.

Another characteristic of the ceric oxide of the invention is that it has a large specific surface after calcination at an elevated temperature.

Thus, it has a specific surface of at least 15 m$^2$/g measured at a temperature of from 800° to 900° C., and preferably ranging from 20 to 100 m$^2$/g measured after calcination at a temperature of 800° C.

The ceric oxide particulates of the invention have a large specific surface ranging from 190 to 280 m$^2$/g, measured after calcination at a temperature of from 350° to 450° C. When exposed to a higher temperature of ultimate use, e.g., in particular in the field of catalysis, such particulates retain their large specific surface.

This specific surface ranges from 20 to 90 m$^2$/g after thermal treatment at a temperature of 800° C.

The ceric oxide particulates of the invention have a pore volume ranging from about 0.15 cm$^3$/g to about 0.30 cm$^3$/g measured after calcination at a temperature of 350° to 450° C.

The pore volume, corresponding to pores having a diameter of less than 60 nm (600Å), is measured on a mercury porosimeter according to ASTM STandard D4284-83 or by the method of nitrogen adsorption isotherms, which is the aforementioned BET method.

After calcination at a temperature of 800° C., such particulates have a pore volume that may range from 0.15 to about 0.30 cm$^3$/g.

The ceric oxide particulates of the invention obtained after calcination at a temperature of from 350° to 450° C. have a mean pore diameter (d$_{50}$) ranging from 2 nm (20 Å) to 10 nm (100 Å).

The "mean diameter" is defined as a diameter such that all pores smaller than this diameter constitute 50% of the total pore volume (Vp) of the pores having diameters less than 60 nm (600 Å).

After calcination at 800° C., the mean diameter ranges from about 10 nm (100 Å) to about 20 nm (200 Å).

X-ray diffraction analysis demonstrates that the ceric oxide of the invention has a crystalline phase of the CeO$_2$ type, with a lattice parameter ranging from 0.542 nm (5.42 Å) to 0.544 nm (5.44 Å), and a high degree of crystallization, in excess of 80% for the ceric oxide obtained after calcination at 350° C. to 450° C. and higher than 90% for a ceric oxide obtained after calcination at 800° C.

The process for preparing a ceric oxide having a specific surface of at least 190 m$^2$/g measured after calcination at a temperature of from 350° to 450° C., comprises:

(a) suspending, in an aqueous solution of a decomposable base, a ceric hydroxide of the general formula (I):

$$Ce\ (M)_x\ (OH)_y\ (NO_3)_z \qquad (I)$$

wherein M is an alkali metal or a quaternary ammonium radical; x is a number ranging from 0.01 to 0.2; y is such that y=4−z+x; and z is a number ranging from 0.4 to 0.7;

(b) heating the resulting suspension in a closed enclosure, or confined reaction zone, to a temperature and pressure respectively lower than its critical temperature and pressure (the autoclaving operation);

(c) cooling such reaction medium and permitting it to return to atmospheric pressure;

(d) separating the ceric hydroxide treated in this manner; and (e) calcining said separated ceric hydroxide.

Thus, it has now been determined that a ceric oxide having a large specific surface both at low and elevated temperatures may be prepared by subjecting a ceric hydroxide, or hydrate of ceric oxide produced by the hydrolysis in a basic medium of a cerium (IV) salt, to an autoclave treatment in a basic medium.

Therefore, in the process of the invention a ceric hydroxide corresponding to formula (I) is used. It is described in EP-A 0,208,580.

More particularly, a cerium (IV) hydroxynitrate is used, which is capable of peptizing, i.e., producing a sol simply upon dispersion thereof in water.

The thermal differential analysis of such product evidences that during its calcination, in air, an exothermic peak at from 250° to 300° C. utilizing a temperature increase of 300° C. per hour.

It has a CeO$_2$ type crystalline phase with a lattice parameter of 0.542 nm to 0.544 nm and a degree of crystallization of from 30% to 70%, preferably from 40% to 60%.

The cerium hydroxide corresponding to formula (I) having the aforesaid characteristics is prepared by a process described in EP-A 0,208,580, comprising preparing a colloidal dispersion of a cerium (IV) compound by reacting an aqueous solution of a cerium (IV) salt with a base, such that a degree of neutralization less than or equal to 3.0 is provided, then subjecting the dispersion to a heat treatment and separating the precipitate thus formed.

In the first stage of the process described in EP-A 0,208,580, a colloidal dispersion of a cerium (IV) compound is prepared. In such dispersion, cerium (IV) is present simultaneously in the form of ions and colloids, indicating the presence of particles having colloidal dimensions. This mixture of ions and colloids is designated a "colloidal dispersion".

The solution of the cerium (IV) salt may be an aqueous solution of ceric nitrate or an aqueous solution of ceriammonia nitrate. Such solutions may contain, without disadvantage, cerium in the cerous state, but it is desirable that they contain at least 85% cerium (IV).

The concentration of the solution of the cerium salt is not a critical factor according to the invention. When expressed as cerium (IV), it may range from 0.1 to 2 moles per liter. A concentration of from 1 to 2 moles per liter is preferred.

The aqueous solution of the cerium (IV) salt typically has a certain initial acidity and may have a normality ranging from 0.1 N to 4 N, and preferably from 0.1 N to 1 N.

The solution of the ceric nitrate produced by the electrolytic oxidation of a solution of cerous nitrate, and described in FR-A 2,570,087 (No. 84/13,641) is the starting material of choice.

The basic solution used in the process of the invention may advantageously be an aqueous solution of ammonia, or of sodium or potassium hydroxide. It is also possible to use gaseous ammonia. Preferably, an ammonia solution is used.

The normality of such basic solution used is not critical; it may range from 0.1 N to 11 N, but preferably from 0.1 N to 5 N.

The proportion of the basic solution and the solution of the cerium (IV) salt must be such that the degree of neutralization is greater than or equal to 0.1 and less than or equal to 3.0.

The degree of neutralization r is given by the following equation:

$$r = (n3 - n2)/n1$$

wherein n1 is the number of moles of cerium (IV) present in the final colloidal dispersion; n2 is the number of $OH^-$ moles required to neutralize the acidity introduced by the aqueous solution of the cerium (IV) salt; n3 is the total number of moles of $OH^-$ introduced by the addition of the base.

The degree of neutralization reflects the colloidal state of the cerium (IV) values:

(i) with r=4, cerium (IV) precipitates in a gelatinous form;

(ii) with r=0, the cerium (IV) is in the ionic state;

(iii) with 0<r<4, the cerium (IV) is in the ionic and/or colloidal state.

For a final concentration of cerium (IV) lower than 0.5 mole/liter, a degree of neutralization higher than or equal to 0.01 and less than or equal to 2.5 is selected, and for a concentration higher than 0.5 mole/liter, such degree of neutralization preferably is higher than or equal to 0.01 and less than or equal 2.0.

In a practical manner, to provide a degree r of neutralization within the above range for a given concentration of cerium (IV) in the final colloidal dispersion, the concentration of the basic solution is adjusted such that it satisfies the following equation:

$$[OH^-] = \frac{(n_1 \cdot r + n_2[Ce(IV)]_i)[Ce(IV)]_i}{n_1([Ce(IV)]_i - [Ce(IV)]_f)}$$

wherein $[OH^-]$ is the concentration in moles/liter of the basic solution; $[Ce(IV)]_f$ is the concentration in cerium (IV) in moles/liter of the final colloidal dispersion; $[Ce(IV)]_i$ is the cerium (IV) concentration in moles/liter of the aqueous solution of cerium (IV) salt; and $n_1$ and $n_2$ are determined by conventional analysis of the aqueous solution of the cerium (IV) salt, i.e., $n_1$ by potentiometric titration with a ferrous salt; and $n_2$ by acid/basic titration after complexing of the cerium with oxalate ions.

The reaction between the aqueous solution of the cerium (IV) salt and the base introduced in the aforesaid amounts is carried out at a temperature ranging from 0° to 60° C., but preferably at ambient temperature, most typically 15° to 25° C.

The admixing of these reagents may be carried out according to any one of a number of different techniques. For example, the mixing may be carried out simultaneously under agitation of the aqueous solution of the salt of cerium (IV) and the basic solution, or, the base may be added continuously, or all at once, to the aqueous solution of the salt of cerium (IV), or conversely.

The duration of the mixing is not critical and may range from 0.1 second to 30 hours, preferably from 2 to 6 hours.

A collidal dispersion of a cerium (IV) compound in an aqueous medium is thus prepared.

It contains cerium (IV) in a concentration which may range from 0.1 to 2 moles/liter, preferably from 0.3 to 0.8 mole/liter.

The amount of cerium (IV) in collidal state generally ranges from 10% to 90% of the cerium (IV) charged.

The mean hydrodynamic diameter of the colloids ranges from about 4 nm (40 angstroms) to about 30 nm (300 angstroms). It is determined by the quasi-elastic diffusion of light according to the method described by Michael L. McConnell in *Analytical Chemistry*, 53, No. 8, 1007A (1981).

This dispersion is subjected to an autoclave thermal treatment at a temperature ranging from 80° to 300° C., preferably from 90° to 110° C., and even more preferably at the reflux temperature of the reaction mixture.

The conditions of the thermal treatment are not critical: it can be conducted at atmospheric pressure or at the pressure corresponding to the pressure of the saturated water vapor corresponding to the temperature of the thermal treatment. The treatment is conducted in an air atmosphere or in an atmosphere of an inert gas, preferably nitrogen.

The duration of the treatment can vary within a wide range of from 2 to 48 hours, preferably from 2 to 24 hours.

Upon completion of this operation, the solid precipitate is separated by conventional solid/liquid separation techniques, such as filtration, decantation, drainage and/or centrifugation.

The product recovered may be dried at a temperature of from 15° to 120° C., preferably at ambient temperature. This can be carried out in the ambient air or under reduced pressure, for example at a pressure ranging from 133.322 Pa to 13332.2 Pa.

A hydroxynitrate of cerium (IV) of formula (I) obtained directly after separation, without any drying, if preferably used.

According to the present invention, the product obtained by hydrolysis of a nitrate salt of cerium (IV) is then treated in an autoclave, prior to calcination.

For this purpose, the ceric hydroxide is employed in the form of a suspension in an aqueous solution of a decomposable base which constitutes the liquid medium for the autoclaving operation.

By "decomposable base" is intended a compound having a $pk_b$ less than 7 and susceptible to decomposition under the conditions of the calcination step of the invention.

Suitable decomposable bases include, for example, ammonia, urea, ammonium acetate, ammonium acid carbonate, ammonium carbonate, or a primary, secondary or tertiary amine, such as, for example, methylamine, ethylamine, propylamine, n-butylamine, sec-butylamine, pentylamine, 2-aminopentane, 2-amino-2-methylbutane, 1-amino-3-methylbutane, 1,2-diaminoethane, 1,2-diaminopropane, 1,3-diaminopropane, 1,4-diaminobutane, 1,5-diaminopentane, 1,6-diaminohexane, dimethylamine, diethylamine, trimethylamine, triethylamine or a quaternary amine such as, for example, tetraalkyl ammonium hydroxide preferably having alkyl radicals of 1 to 4 carbon atoms, and more particularly tetramethyl ammonium hydroxide or tetraethyl ammonium hydroxide.

A mixture of such bases can also be used.

Preferably a solution of ammonia, or of tetraalkyl ammonium hydroxide, or a mixture thereof, is used.

The concentration of the base in the liquid autoclaving medium is not critical according to the invention. It may vary over large limits, for example ranging from 0.1 N to 11 N, but it is preferable to use a solution having a concentration of from 1 to 10 N.

In the liquid medium, the concentration of the ceric hydroxide, expressed as $CeO_2$, varies, preferably from 0.1 to 3.0 moles/liter and even more preferably from 0.2 to 1.0 moles/liter.

The autoclaving operation is carried out at a temperature ranging from the reflux temperature to the critical temperature of the reaction mixture. Preferably, such temperature ranges from 100° to 350° C. and even more preferably from 150° to 350° C. The increase in temperature is effected at a rate which is not critical. The reaction temperature is attained by heating, for example, for a period of time of from 30 minutes to one hour.

The process of the invention may be carried out by introducing the ceric hydroxide in suspension into the liquid medium in a confined reaction zone, in which case superatmospheric pressure will result only upon heating of the reaction mixture.

Under the temperature conditions given above, and in an aqueous medium, the pressure will thus range from 1 ($10^5$ Pa) to 165 bars ($165 \times 10^5$ Pa), preferably 5 ($5 \times 10^5$ Pa) to 165 bars ($165 \times 10^5$ Pa).

It is also possible to exert an external pressure which, in such case, is added to the pressure resulting from heating.

The duration of the autoclaving operation is not critical. It may range, for example, from 30 minutes to 6 hours.

Upon completion of the autoclaving, cooling is permitted at the inertia of the system and the system is returned to atmospheric pressure.

The product in suspension in the liquid medium is separated by conventional solid/liquid separation techniques, such as decantation, drainage filtration and/or centrifugation.

The product recovered may optionally be washed, preferably with water, and/or dried under the conditions previously described.

In the last stage of the process, the recovered product is calcined at a temperature ranging from 300° to 1,000° C., preferably from 350° to 800° C.

The duration of the calcination may vary over wide limits, for example from 30 minutes to 10 hours, preferably from 2 to 6 hours.

In one embodiment of the invention, the ceric hydroxide in suspension in a liquid medium is subjected to a first heat treatment in a closed vessel at a temperature and pressure respectively less than the critical temperature and critical pressure of the liquid medium, i.e., it is subjected to a first autoclave treatment. The liquid medium is preferably water.

The autoclaved suspension is then subjected to a second autoclaving operation as described above, with a liquid medium containing a decomposable base.

The suspension after the first autoclavage may be concentrated or diluted, or the ceric hydroxide may be separated and recovered, for example by filtration, prior to redispersion in a second autoclave medium. The precipitate recovered in this manner may be washed and dried prior to redispersion.

The conditions of the first autoclaving operation are similar to those described for the autoclaving in a basic medium. However, the concentration in ceric hydroxide, expressed as $CeO_2$, may be higher, ranging, for example, from 0.1 to 4 moles/liter.

The ceric oxide according to the invention has a large specific surface after calcination at low and high temperatures such that it is well suited for application in the field of catalysis, whether as a catalyst or catalytic support.

It is especially well adapted for use as a catalytic support in reactions for the catalytic conversion of exhaust gases from internal combustion engines.

In order to further illustrate the present invention and the advantages thereof, the following specific examples are given, it being understood that same are intended only as illustrative and in nowise limitative.

EXAMPLE 1

1. Synthesis of Ceric Oxide

Into a three-necked 6 l flask, equipped with a thermometer, an agitator, and a system for the introduction of reagents (metering pump), the following materials were introduced at ambient temperature:

(i) 1,000 cm$^3$ of a ceric nitrate solution containing 1.24 moles/liter cerium (IV) and having a free acidity of 0.332 N; and (ii) 2,555 cm$^3$ of a 0.3726 N ammonia solution.

The addition of the ammonia solution at ambient temperature to the ceric nitrate solution was carried out at a rate of 1,664 cm$^3$/h.

A colloidal aqueous dispersion of a cerium (IV) compound was thus produced, at a concentration, expressed as $CeO_2$, equal to 60 g/l and having a degree of neutralization r=0.5.

In a second stage, the dispersion obtained was subjected to a heat treatment in a double-walled reactor equipped with reflux means and an agitator, at 100° C. for 4 hours.

After filtration, 287 g of a yellow product were recovered.

Chemical analysis of the product obtained indicated the following chemical composition:

(a) ignition weight = 20%
(b) $CeO_2$ = 80%
(c) molar ratio $NO_3^-/Ce^{(IV)}$ = 0.49
(d) molar ratio $NH_4^+/Ce^{(IV)}$ = 0.025.

Autoclaving of the Ceric Hydroxide

Into an autoclave having an active volume of 1 liter, 400 cm$^3$ of a 2 N aqueous ammonia solution and 24 g of the ceric hydroxide prepared under (1), were successively introduced.

After homogenization of the latter in its medium, the apparatus was heated to 180° C. or about 12 bar (12×10⁵ Pa), for one hour.

Upon completion of this treatment, the precipitate thus formed was filtered on a Büchner filter.

Two fractions of the wet product were subjected to calcination under the following conditions: 6 hours at 350° C. and 6 hours at 800° C.

The specific surface of the ceric oxide produced was then determined by the method described above, as was its pore volume.

The size of the crystallites perpendicular to the 110 and 120 directions and the degree of crystallization were determined by X-ray diffraction. The results obtained are reported in Table I below:

TABLE I

| Example | Calcining temperature (°C.) | Specific surface (m²/g) | Pore volume (cm³/g) | Crystallite size (nm) | Degree of crystallization (%) |
|---|---|---|---|---|---|
| 1 | 350 | 250 | 0.17 | 4 | 80 |
| 1 | 800 | 50 | 0.15 | 20 | 90 |

It will be noted that the ceric oxide of the invention had a high specific surface, measured both after calcination at a low temperature (350° C.) and at a high temperature (800° C.).

EXAMPLES 2 AND 3

1. Synthesis of the Ceric Hydroxide

In these experiments, a ceric hydroxide prepared according to Example 1 was used, with the exception that the amount of the base added was such that the degree of neutralization was equal to 1.5 in Example 2 and 3.0 in Example 3.

2. Autoclaving of the Ceric Hydroxide

Following the procedure of Example 1, 24 g ceric hydroxide prepared according to (1) were suspended in 400 cm³ of a 2 N aqueous ammonia solution and subjected to an autoclave treatment at 180° C. for 1 hour.

Upon completion of this heat treatment, the precipitate thus formed was separated by filtering and calcined under the following conditions: one fraction was calcined for 6 hours at 350° C. and two other fractions were calcined for 6 hours at 600° and 800° C.

The results obtained are reported in Table II which follows:

TABLE II

| Example | Calcining temperature (°C.) | Specific surface (m²/g) |
|---|---|---|
| 2 | 350 | 260 |
| 2 | 600 | 150 |
| 2 | 350 | 50 |
| 3 | 350 | 260 |
| 3 | 600 | 140 |
| 3 | 800 | 45 |

EXAMPLE 4

1. Synthesis of the Ceric Hydroxide

In this experiment, a ceric hydroxide prepared according to Example 1 was used.

2. Autoclave Treatment of the Ceric Hydroxide (a) The ceric hydroxide was suspended in water at a concentration of 400 g/l, expressed as CeO₂. The suspension was heated to 180° C. in a sealed enclosure for 1 hour. The autoclave pressure was about 12 bars (12×10⁵ Pa).

(b) After cooling the suspension, 2 N ammonia was added to provide a suspension having 60 g/l CeO₂. This suspension was then treated as in Example 2.

The properties of the product obtained were as follows:

(1) after calcination at 350° C. for 6 hours:
  (i) specific surface: 187 m²/g;
  (ii) mean crystallite size: 5.5–5 nm;
  (iii) % crystallization: 97%.
(2) after calcination at 800° C. for 6 hours:
  (i) specific surface: 80 m²/g;
  (ii) mean crystallite size: 14 nm;
  (iii) % crystallization: 98%.

The product had an ignition weight on the order of 5%.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of ceric oxide particulates having a specific surface of at least 15 m²/g, measured after calcination at a temperature of 800° C., comprising (a) suspending, in an aqueous solution of a decomposable base, a ceric hydroxide of the formula (I):

$$Ce(M)_x(OH)_y(NO_3)_z \qquad (I);$$

wherein M is an alkali metal or a quaternary ammonium radical; x is a number ranging from 0.01 to 0.2; y is such that $Y = 4 - z + x$; and z is a number ranging from 0.4 to 0.7; (b) heating the resulting suspension in a sealed reaction zone to a temperature and pressure respectively lower than its critical temperature and pressure; (c) cooling it and permitting it to return to atmospheric pressure; (d) separating the ceric hydroxide thus treated; and (e) calcining the separated ceric hydroxide for a time effective to produce a calcined ceric oxide product having a specific surface of at least 15 m²/g after calcination at a temperature of 800° C. for two hours.

2. The process as defined by claim 1, said ceric hydroxide of formula (I) being prepared by reacting an aqueous solution of a cerium (IV) salt with a base, to attain a degree of neutralization no greater than 3.0, next heat treating the colloidal dispersion of a cerium (IV) compound thus formed, and separating therefrom the resulting ceric hydroxide precipitate.

3. The process as defined by claim 2, wherein said aqueous solution of a cerium (IV) salt is reacted with said base to a degree of neutralization of at least 0.01 and no greater than 3.0.

4. The process as defined by claim 3, said cerium (IV) salt comprising ceric nitrate or ceriammonium nitrate.

5. The process as defined by claim 4, wherein the concentration of the cerium (IV) salt in the aqueous solution thereof ranges from 0.1 to 2 moles per liter, expressed as CeO₂.

6. The process as defined by claim 3, said aqueous solution of a cerium (IV) salt having been prepared by electrochemical oxidation of a cerous nitrate solution.

7. The process as defined by claim 3, said base comprising an aqueous ammonia solution.

8. The process as defined by claim 7, said base having a normality ranging from 0.1 N to 5 N.

9. The process as defined by claim 2, comprising heat treating the colloidal dispersion to a temperature of from 80° to 300° C.

10. The process as defined by claim 1, said decomposable base comprising ammonia, urea, ammonium bicarbonate, ammonium carbonate, a primary, secondary, tertiary or quaternary amine, or mixture thereof.

11. The process as defined by claim 10, said decomposable base comprising ammonia, a tetraalkylammonium hydroxide, or mixture thereof.

12. The process as defined by claim 1, said aqueous solution of a decomposable base having a concentration ranging from 1 to 10 N.

13. The process as defined by claim 1, comprising autoclaving said aqueous suspension at a temperature ranging from 100° to 350° C.

14. The process as defined by claim 13, comprising autoclaving at a temperature ranging from 150° to 350° C.

15. The process as defined by claim 13, comprising autoclaving said aqueous suspension at a pressure ranging from 1 to 165 bars.

16. The process as defined by claim 1, comprising calcining the ceric hydroxide at a temperature ranging from 300° to 1,000° C.

17. The process as defined by claim 16, comprising calcining for from 2 to 6 hours.

18. The process as defined by claim 1, wherein the concentration of ceric hydroxide in the aqueous suspension, prior to said heat treatment (b), ranges from 0.1 mole to 4 moles/liter, expressed as $CeO_2$.

* * * * *